3,038,928
2-ACYL DERIVATIVES OF 1-CYANOFORMIMIDIC ACID HYDRAZIDE
Lucille Theresa Morin and Ken Matsuda, Stamford, Conn., assignors to American Cyanamid Company, New York, N.Y., a corporation of Maine
No Drawing. Filed May 6, 1960, Ser. No. 27,265
13 Claims. (Cl. 260—465.4)

This invention relates to a novel class of useful compounds. More particularly, the invention relates to new 2-acyl derivatives of 1-cyanoformimidic acid hydrazide and a process for their preparation.

Compounds contemplated by the present invention may be represented by the general formula:

wherein R is a lower aliphatic, an aryl or halogen-substituted aryl radical, said halogen having an atomic weight equal to at least about 35. Representative compounds include:

1-cyanoformimidic acid (2-acetylhydrazide)
1-cyanoformimidic acid (2-acrylylhydrazide)
1-cyanoformimidic acid (2-butyrylhydrazide)
1-cyanoformimidic acid (2-benzoylhydrazide)
1-cyanoformimidic acid (2-p-chlorobenzoylhydrazide)
1-cyanoformimidic acid (2-o-bromobenzoylhydrazide)
1-cyanoformimidic acid (2-naphthoylhydrazide)
  their homologs and isomers.

Such hydrazide compounds as defined above find utility as rodenticides. In particular, the 1-cyanoformimidic acid (2-acrylylhydrazide) exhibits herbicidal properties.

In accordance with the practice of the present invention, the aforementioned compounds are prepared in a straightforward manner by reacting 1-cyanoformimidic acid hydrazide with an acyl halide or a lower alkyl monocarboxylic acid anhydride derived from (1) lower alkyl monocarboxylic acid, (2) lower alkylene monocarboxylic acid, (3) aryl monocarboxylic acid or (4) a halogen-substituted aryl monocarboxylic acid. When carrying out the new process for preparing 2-acyl derivatives of 1-cyanoformimidic acid hydrazide, an inert solvent may be employed, if desired. Inert solvents which are utilized herein include, for example: water, benzene, dioxane, ether and tetrahydrofuran. Advantageously, a hydrogen halide acceptor such as sodium hydroxide, sodium carbonate and equivalents thereof may be added thereto, especially when aroyl halides are employed as acylating agents.

Illustrative acyl halides or lower alkyl monocarboxylic acid anhydrides include aliphatic compounds such as: acetic anhydride, n-butyrylchloride, pentanoyl chloride, acrylyl chloride, and aromatic compounds such as: benzoyl chloride, naphthoyl bromide, benzoyl fluoride, p-chlorobenzoyl chloride, o-bromobenzoyl bromide, p-iodobenzoyl iodide, their isomers and homologs.

Reactant, 1-cyanoformimidic acid hydrazide, is prepared by bringing into reactive combination equimolar quantities of cyanogen and hydrazine. The over-all process is described more fully below.

In general, the relative proportion of reactants can vary widely according to the process of the invention. For instance, a mol excess of the acyl compound with respect to 1-cyanoformimidic acid hydrazide can be advantageously employed. However, for good practice, substantially equimolar amounts of the reactants are employed.

The preparation of the novel class of compounds disclosed and claimed herein can be carried out at temperatures extending from the freezing point to the boiling point of the reaction mixture. However, it is preferred that the reaction be carried out at a temperature in a range of about 0° C. to about 30° C.

The following examples are illustrative and are not to be taken as limitative of the practice of the invention. All parts, proportions and percentages are by weight unless otherwise noted.

EXAMPLE A

*Preparation of 1-Cyanoformimidic Acid Hydrazide*

To a suitable reaction vessel equipped with stirrer 156 parts of cyanogen is added to 1000 parts of dioxane at about 5° C. over a period of 2.5 hours while agitating. A solution of 96 parts of hydrazine in 330 parts of a dioxane-methanol (10 to 1) mixture is slowly added while maintaining the temperature within about 5° C. After about one-half hour, crystallization commences and the solution gradually turns orange. Agitation is continued for an additional one-half hour after all the hydrazine has been added at about 5° C. The product is collected by filtration as 208.3 parts of light orange solid, melting at 73°–77° C. It is recrystallized from ethylene dichloride, yielding yellow plates whose melting point is 83°–86° C.

EXAMPLE 1

*Preparation of 1-Cyanoformimidic Acid (2-Acetylhydrazide)*

12 parts of acetic anhydride (0.12 mol) are added to 100 parts of benzene in a suitable reaction vessel equipped with stirrer. 8.4 parts of 1-cyanoformimidic acid hydrazide (0.10 mol) prepared in Example A above is slowly added with stirring at about 10° C. Precipitation of desired compound began immediately. The mixture is stirred for an additional hour and filtered. The precipitate is washed with ether and dried to give 12.5 parts of a white solid, M.P. 213° C. (dec.). Recrystallization from acetone gave white crystals, M.P. 217° C. (dec.).

Analysis for: ($C_4H_6N_4O$). Calculated: C, 38.09; H, 4.79; N, 44.42; O, 12.68; M.W. 126.1. Found: C, 38.43; H, 4.78; N, 44.29; O, 13.37; M.W. 132.6.

EXAMPLE 2

*Preparation of 1-Cyanoformimidic Acid (2-Butyrylhydrazide)*

Repeating Example 1 in every material aspect except that 10.7 parts of butyryl chloride (0.1 mol) is substituted for acetic anhydride. 14 parts of a white solid having the following analysis is obtained:

Analysis for: ($C_6H_{10}N_4O$). Calculated: C, 46.75; H, 6.49; N, 36.36; O, 10.39. Found: C, 46.83; H, 6.35; N, 36.22; O, 10.53.

EXAMPLE 3

*Preparation of 1-Cyanoformimidic Acid (2-Acrylylhydrazide)*

To a suitable reaction vessel equipped with stirrer are added 42 parts of 1-cyanoformimidic acid hydrazide (0.5 mol) and 1 part of hydroquinone dissolved in 300 parts of water. The mixture is cooled to 10° C. To the latter are added slowly 45.2 parts of acrylyl chloride (0.5 mol) while adding 100 parts of 20% aqueous sodium hydroxide dropwise with stirring. Stirring is continued for at least one hour. The contents in the reaction vessel are filtered and the desired product recovered. It is washed with water and dried to give 48 parts of a tan solid, which does not melt but darkens slowly to 300° C. Recrystallization from ethanol gave a white solid which does not melt.

Analysis for: ($C_5H_6N_4O$). Calculated: C, 43.47; H, 4.37; N, 40.56; O, 11.58; M.W. 138.1. Found: C, 43.53; H, 4.43; N, 40.52; O, 11.64; M.W. 141.2.

EXAMPLE 4

*Preparation of 1-Cyanoformimidic Acid (2-Benzoylhydrazide)*

84 parts of 1-cyanoformimidic acid hydrazide (0.10 mol) dissolved in 150 parts of water and 40 parts of 10% aqueous sodium hydroxide are added to a suitable reaction vessel. 14 parts of benzoyl chloride (0.10 mol) are next added with shaking and occasional cooling so that the temperature does not rise above 30° C. The precipitation of desired product begins shortly. When precipitation of the desired product ceases, the cooled mixture is filtered to give 13.7 parts of tan solid, M.P. 197° C. (dec.). Recrystallization from acetonitrile gave white needles, M.P. 207° C. (dec.) having the following analysis:

Analysis for: ($C_9H_8N_4O$). Calculated: C, 57.43; H, 4.28; N, 29.77; O, 8.50; M.W. 188.2. Found: C, 57.28; H, 4.34; N, 29.84; O, 8.54; M.W. 184.2.

EXAMPLE 5

Substituting naphthoyl chloride for benzoyl chloride in Example 4 above, the corresponding 1-cyanoformimidic acid (2-naphthoylhydrazide) is obtained when following the procedure of that example in every material detail. The product analyzes as:

Analysis for: ($C_{13}H_{10}N_4O$). Calculated: C, 65.54; H, 4.23; N, 23.52; O, 6.71. Found: C, 65.38; H, 4.19; N, 23.77; O, 6.92.

EXAMPLE 6

*Preparation of 1-Cyanoformimidic Acid (2-p-Chlorobenzoylhydrazide)*

To a suitable reaction vessel are added 4.2 parts of 1-cyanoformimidic acid hydrazide (0.05 mol) dissolved in 150 parts of water. At room temperature, 8.8 parts of p-chlorobenzoyl chloride (0.05 mol) and a solution of 4.6 parts of sodium carbonate (0.05 mol) in 28 parts of water are added dropwise and alternatingly with stirring while keeping the p-chlorobenzoyl chloride in excess with respect to the carbonate. The mixture is stirred for an additional one-half hour and filtered to give 10.5 parts of a tan solid, M.P. 220° C. (dec.). Recrystallization from acetonitrile gave a white solid, M.P. 238–9° C. (dec.). On analysis the following is ascertained:

Analysis for: ($C_9H_7N_4OCl$). Calculated: C, 48.54; H, 3.17; N, 25.16; O, 7.18; Cl, 15.94. Found: C, 48.40; H, 3.41; N, 25.32; O, 8.08; Cl, 15.76.

EXAMPLE 7

To demonstrate the rodenticidal utility of the compounds described in the examples above, the following test is made.

Ten mice averaging 18–25 grams are fed a 2% aqueous starch suspension containing 1500 milligrams of each test compound per kilogram of each mouse weight.

Within 24 hours after the feeding was completed, 100% kill is recorded.

EXAMPLE 8

To illustrate the herbicidal activity of the acrylylhydrazide compound the following test is made:

Approximately 50 radish seeds and 50 wheat seeds are each placed in separate 1-ounce bottles together with 25 cc. of a 0.1% water suspension separately containing 1-cyanoformimidic acid (2-acrylylhydrazide). The bottle containing seed and test compound is clamped in place on a tumbler where it is rotated for twenty hours. The contents are then removed and are washed with approximately 250 cc. of water to remove excess and unfixed test compound. The washed seeds are placed on moist blotters and are held in a high humidity cabinet for a five-day germination period. At the end of this time 100% seed mortality is recorded.

We claim:

1. A compound, 1-cyanoformimidic acid (2-acylhydrazide), said acyl substituent being selected from the group consisting of acetyl, butyryl, acrylyl, benzoyl, naphthoyl and halogen-substituted benzoyl, said halogen having an atomic weight equal to at least about 35.

2. 1-cyanoformimidic acid (2-acetylhydrazide).

3. 1-cyanoformimidic acid (2-butyrylhydrazide).

4. 1-cyanoformimidic acid (2-acrylhydrazide).

5. 1-cyanoformimidic acid (2-benzoylhydrazide).

6. 1-cyanoformimidic acid (2-p-chlorobenzoylhydrazide).

7. A process for the preparation of 1-cyanoformimidic acid (2-acylhydrazide), said acyl substituent being selected from the group consisting of acetyl, butyryl, acrylyl, benzoyl, naphthoyl and halogen-substituted benzoyl, said halogen having an atomic weight equal to at least about 35, which comprises: reacting 1-cyanoformimidic acid hydrazide and an acylating agent selected from the group consisting of acetic anhydride, n-butyryl chloride, acrylyl chloride, benzoyl chloride, naphthoyl bromide, benzoyl fluoride, p-chlorobenzoyl chloride, o-bromo-benzoyl bromide and p-iodobenzoyl iodide, in substantially equimolar quantities and at temperatures ranging from about 0° C. to about 30° C., and recovering 1-cyanoformimidic acid (2-acylhydrazide) so-formed.

8. The process according to claim 7 wherein the acylating agent is acetic anhydride.

9. The process according to claim 7 wherein the acylating agent is n-butyryl chloride.

10. The process according to claim 7 wherein the acylating agent is acrylyl chloride.

11. The process according to claim 7 wherein the acylating agent is benzoyl chloride.

12. The process according to claim 7 wherein the acylating agent is p-chlorobenzoyl chloride.

13. The process according to claim 7 wherein the reaction is carried out in the presence of a hydrogen halide acceptor selected from the group consisting of sodium hydroxide and sodium carbonate.

References Cited in the file of this patent

UNITED STATES PATENTS

| | | |
|---|---|---|
| 2,313,497 | Allen et al. | Mar. 9, 1943 |
| 2,909,556 | Heininger | Oct. 20, 1959 |
| 2,940,956 | Smith | June 14, 1960 |